H. O. BERGERSON.
TREADLE OPERATING MECHANISM.
APPLICATION FILED AUG. 21, 1913.
1,161,018.
Patented Nov. 23, 1915.
2 SHEETS—SHEET 1.
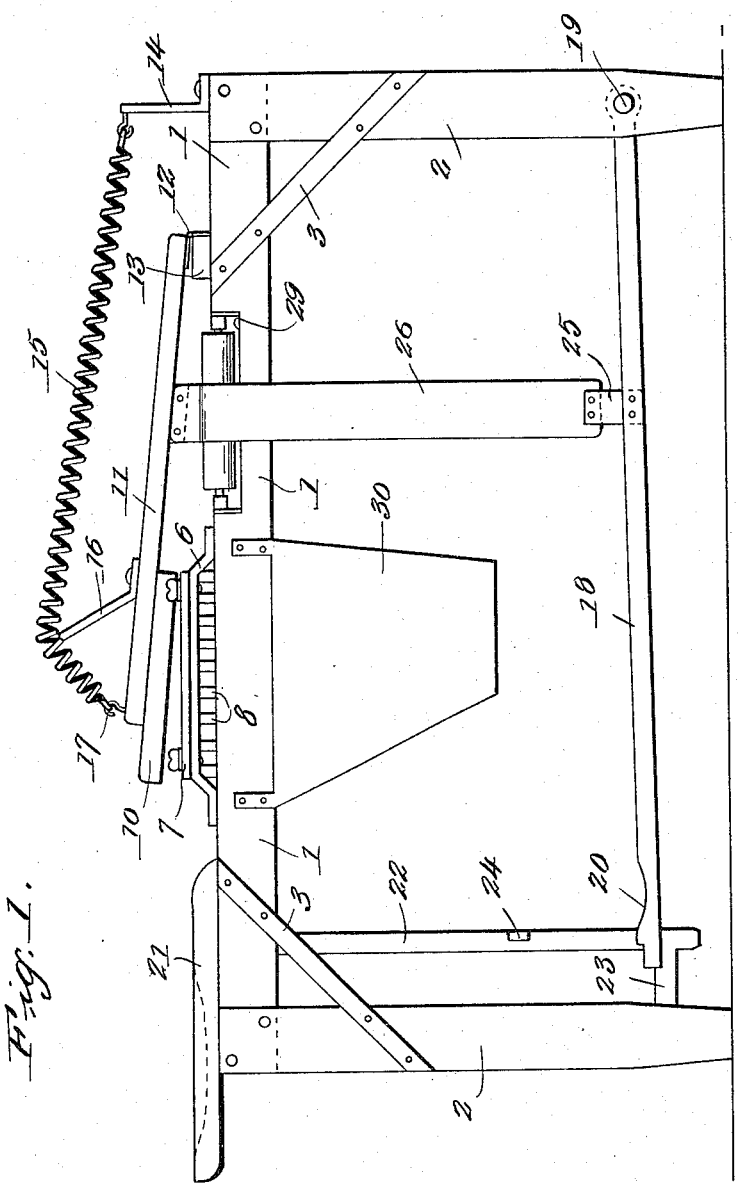

H. O. BERGERSON.
TREADLE OPERATING MECHANISM.
APPLICATION FILED AUG. 21, 1913.
1,161,018.
Patented Nov. 23, 1915.
2 SHEETS—SHEET 2.
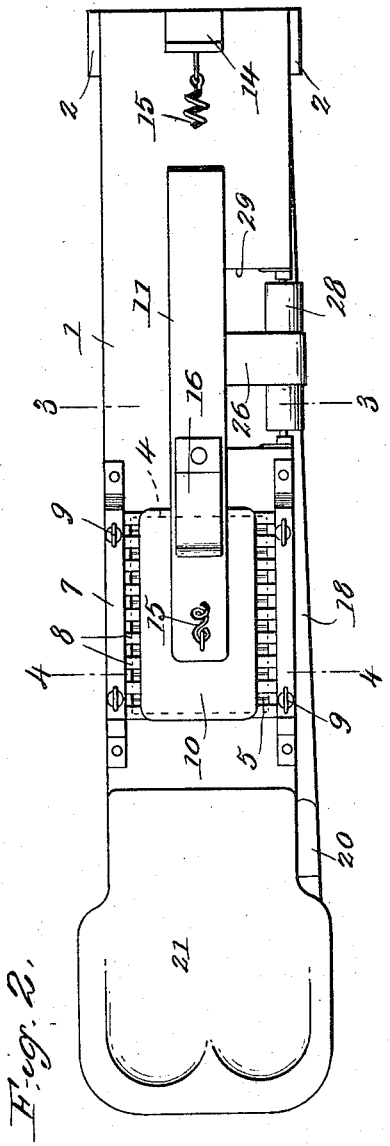
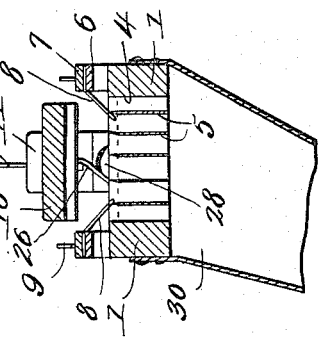
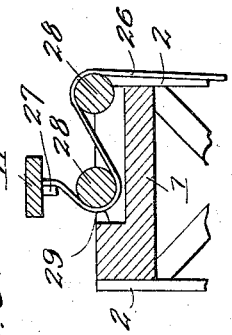
Witnesses
B. M. La Scola
W. Evalk Jr.
Inventor
Henry O. Bergerson,
By
his Attorney

UNITED STATES PATENT OFFICE.

HENRY C. BERGERSON, OF HAWLEY, MINNESOTA.

TREADLE OPERATING MECHANISM.

1,161,018.  Specification of Letters Patent.  Patented Nov. 23, 1915.

Application filed August 21, 1913. Serial No. 785,991.

*To all whom it may concern:*

Be it known that I, HENRY O. BERGERSON, citizen of the United States, residing at Hawley, in the county of Clay and State of Minnesota, have invented certain new and useful Improvements in Treadle Operating Mechanism, of which the following is a specification.

This invention relates to potato cutters, the object of the invention being to provide a simple manually operated machine for slicing up seed potatoes in proper condition for planting, the machine embodying means whereby the blocks or slices when cut, are conveyed to a suitable receptacle provided therefor by means of a chute adapted to be arranged beneath the cutting mechanism employed in connection with my invention.

The invention still further resides in the provision of spring means for returning the operating block to its normal position after the same has been forced into engagement with the potatoes acted upon during a cutting operation.

A still further object of the invention resides in the provision of specially devised means whereby motion is imparted to the operating block through the medium of a foot operated lever mounted upon the machine, the said means being arranged and operated in a manner to be hereinafter fully described.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1 is a side elevation of a potato cutting machine constructed in accordance with my invention; Fig. 2 is a top plan view, the spring being partly broken away; Fig. 3 is a section on the line 3—3 of Fig. 2; and Fig. 4 is a section on the line 4—4 of Fig. 2.

Referring now to the drawings, wherein is illustrated the preferred form of my invention the numeral 1 designates the stand or body portion upon which the mechanism comprising my invention is arranged, the said body portion being supported and maintained in operative position by means of legs 2 depending therefrom. Braces 3 extend at an angle from the body 1 to the legs 2 as shown. Within the body 1 I provide an opening 4 having a plurality of cutting blades 5 extending transversely thereof, one set of blades being removable to permit cutting of the potatoes acted upon in slices as well as blocks, the cutting being effected in a manner to be hereinafter fully described. At each side of the opening 4 I provide a suitable bracket 6 to each of which is adjustably secured a clamping bar 7 for detachably fastening a plurality of guide strips 8 in proper place. The said strips 8 are interposed between the upper face of the bracket 6 and the under face of the clamping bar 7, the latter being forced into engagement therewith through the medium of thumb screws 9 extending therethrough. The arrangement of the strips 8 as shown to advantage in Fig. 4 of the drawings acts as a guide for the potatoes acted upon, the said strips conveying or guiding the potatoes on to the cutting edges of the knives against which they are forced in a manner to be hereinafter fully described. An operating block 10 is mounted for oscillatory movement upon the body 1, the said block being secured in any suitable manner to an operating arm 11 one end of which is hinged as at 12 to a suitable support member 13. Adjacent the hinged end of the arm 11 and secured to the body 1 I provide a bracket 14 to which one end of a spring 15 is secured, the opposite end being arranged over a bracket 16 mounted upon the said arm 11 near the free end thereof and secured as at 17 to the said free end of the arm for returning the latter to its normal position when acted upon by the operating means forming a part of the present invention. The said operating means comprises an operating lever 18 pivotally secured as at 19 to one of the legs 2 of the machine the free end having a pedal formed thereupon by means of which the said lever 18 is manually operated, as the operator's seat 21 of the machine is disposed upon the said body 1 directly over the said pedal. Guide means including a bar 22 and base 23 is provided for the operating lever 18 the latter being maintained in frictional engagement with the said bar at all times. A stop block 24 is carried by the bar 22 to limit the oscillatory movement of the lever during operation.

Intermediate the ends of the lever 18 a strap 25 is secured, the said strap connecting a belt 26 with the lever. The opposite end of the belt 26 from that secured to the strap 25 is secured to a block 27 carried by the operating arm 11 for actuating or oscillating the latter according to the movement of the said lever. To facilitate the movement of the belt 26, rollers 28 have been provided over which the said belt rides, the rollers being mounted for rotation within a cut out portion 29 formed within the body 1 at one side thereof.

To convey the potatoes, when cut, into a suitable receptacle provided therefor, a chute 30 has been provided, the said chute being connected to the body 1 directly beneath the opening 4 thereof.

Having described in detail the construction of the machine, it now remains to set forth a little more fully the operation thereof. The potatoes acted upon are first placed over the opening 4 of the body 1, the blades 5 acting as supports therefor. When thus positioned, the operating lever 18 is actuated and oscillatory movement imparted to the arm 11 through the medium of the connecting means 26 above described. As the arm 11 is oscillated, the block 10 carried thereby is swung into and out of engagement with the cutting edges of the knives 5, such engagement forcing the potatoes supported by the said knives between the blades or knives and into the chute 30 arranged therebeneath.

From the above, taken in connection with the accompanying drawings, it is apparent that the potatoes are maintained in engagement with the knives 5 through the medium of the guide strips 8 disposed at each side of the said opening; that the spring 15 automatically returns the operating block 10 to its initial position as the pressure is relieved upon the operating lever 18; and that the supply of potatoes acted upon may be fed to the knives 15 during the upward stroke of the arm 11, thereby rendering injury to the operator unlikely.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In operating mechanism, a support, a seat at one end of said support, an arm pivoted for vertical oscillatory movement at the opposite end of and on the top of said support, a spring secured at one end to said arm and at its opposite end to said support for maintaining the former normally in an elevated position, a treadle pivoted at one side of said support and in a horizontal plane below said arm to terminate at a point in proximity to said seat, a vertical guide bar disposed for engagement with the free end of said treadle to preclude lateral displacement thereof, a stop means on said guide bar to limit movement of said treadle, rollers mounted on said support in proximity to said arm, and a flexible element engaging said rollers and connected at one end to said arm and at its opposite end to said treadle, substantially as described.

In testimony whereof I affix my signature in presence of two witnesses.

HENRY O. BERGERSON.

Witnesses:
GUSTAV SJORDAL,
GILBERT GUNDERSON.

Copies of this patent may be obtained for five cents each, by addressing the "Commissioner of Patents, Washington, D. C."